US008717674B2

(12) United States Patent
Thomas et al.

(10) Patent No.: US 8,717,674 B2
(45) Date of Patent: May 6, 2014

(54) CUSTOM FILTRATION SLIDE AND FILTRATION APPARATUS AND METHOD

(75) Inventors: Michael Thomas, West Hartford, CT (US); Charles Climer, Cheshire, CT (US); Richard Schlueter, Clinton, CT (US); Triantafyllos P. Tafas, Rocky Hill, CT (US); Michael Kilpatrick, West Hartford, CT (US); Antti Seppo, New York, NY (US)

(73) Assignee: Ikonisys, Inc., New Haven, CT (US)

( * ) Notice: Subject to any disclaimer, the term of this patent is extended or adjusted under 35 U.S.C. 154(b) by 465 days.

(21) Appl. No.: 12/833,887

(22) Filed: Jul. 9, 2010

(65) Prior Publication Data
US 2011/0122492 A1    May 26, 2011

Related U.S. Application Data

(60) Provisional application No. 61/224,680, filed on Jul. 10, 2009.

(51) Int. Cl.
*B01D 35/02*    (2006.01)
*G02B 21/34*    (2006.01)

(52) U.S. Cl.
USPC ............................ 359/398; 422/513; 422/534

(58) Field of Classification Search
USPC ........................ 422/513, 534; 359/396, 398
See application file for complete search history.

(56) References Cited

U.S. PATENT DOCUMENTS

| 4,808,307 | A  | * | 2/1989  | Fischel et al. ............ 210/321.68 |
|-----------|----|---|---------|---------------------------------------|
| 5,302,348 | A  | * | 4/1994  | Cusack et al. .................. 422/73 |
| 6,312,591 | B1 | * | 11/2001 | Vassarotti et al. .......... 210/195.2 |
| 6,482,362 | B1 | * | 11/2002 | Smith ........................... 422/513 |
| 7,335,337 | B1 | * | 2/2008  | Smith ........................... 422/513 |
| 8,148,168 | B2 | * | 4/2012  | Gjerde et al. ................. 436/178 |
| 8,357,544 | B2 | * | 1/2013  | Ingenhoven et al. ......... 436/180 |
| 8,409,528 | B2 | * | 4/2013  | Safar et al. .................... 422/547 |
| 8,449,830 | B2 | * | 5/2013  | Claussen et al. .............. 422/130 |

* cited by examiner

*Primary Examiner* — Frank Font
(74) *Attorney, Agent, or Firm* — Kelley Drye & Warren LLP

(57) ABSTRACT

An filter, apparatus and method for preparing microscope slides is presented. After filtration of the specimen is performed, the filter containing the filtrand is configured to be microscopically examined. The filter may either be affixed to a microscope slide or, in an embodiment, the filter may be incorporated into a microscope slide.

14 Claims, 6 Drawing Sheets

CUSTOM FILTRATION SLIDE AND FILTRATION APPARATUS AND METHOD

RELATED APPLICATIONS

This application claims the benefit of priority to U.S. provisional application Ser. No. 61/224,680, filed Jul. 10, 2009, which is incorporated herein by reference in its entirety.

FIELD OF INVENTION

The preparation of specimens for microscopic examination may require the separation a material, such as a biological material, to form a high concentration of a target of interest. Separation may be way of a filter. Filters are devices, often in the form of a membrane or layer, that are designed to physically block certain objects or substances while letting other objects or substances through. When a suspension is filtered, the solid in the liquid is referred to as the filtrate while the solid remaining in the filter is called alternative the retentante, residue or filtrand.

Filters are generally of two major types: surface filters comprising a solid sieve that traps materials, which may or may not have functional groups that interact with the material desired to be trapped to aid in the filtration, and a depth filter, which reference a bed of material that retains certain materials as they pass through the depth filter. Filters may come in various porosities and grades, and may include functionally active groups, depending on the material sought to be caught by the filter. Conventional filters often comprise acid washed wooden fibers, carbon fibers or quartz fibers. Filters may also be impregnated with various reagents allowing for reactions with respect to the filter and the filtrand desired to be segregated from other material. Filters membranes or layers are often used in conjunction with a funnels, such as a filter funnel, Hirsch, or Buchner funnel.

The effectiveness of filtration may require proper environmental conditions, such as temperature, humidity etc. Further, the application of a controlled differential pressure between the input and output sides of the filter may significantly impact the filtration process. Too great a pressure may damage the specimen or compromise the selectivity of the filter while too low a pressure may result in excessively long filtration times or, depending on the viscosity of the suspension fluid, a lack of filtering action all together.

After filtration, the filtrand is often removed from the filter and transferred to a suitable medium for examination. One such medium is the microscope slide. The mechanical removal of the targeted structures from the filter to the examination medium must be performed with significant care to prevent compromising the integrity of the sample or the quantity of the sample transferred. The filtered material may also have to be treated with different materials, such as probes, to allow for the examination.

BRIEF SUMMARY OF THE INVENTION

The present inventors have recognized that present filtration techniques offer too many opportunities for compromising the integrity of microscopic examination. For example, transfer of the filtrand from the filter to the slide may result in the loss of too much material for the needs of the microscopic examination, offers the opportunity for introduction of contaminants into the sample, and may damage the filtrand sample to be examined. To overcome such problem, the inventors propose herein in one embodiment a filter system that allows for direct application of the filter containing the filtrand to a microscopic slide (making it unnecessary to remove the filtrand from the filter), and in another embodiment a slide-filter that allows the slide to be both used as filter, and then interrogated directly as a typical microscope slide (making it unnecessary to apply the filter with filtrand to a separate microscope slide).

The filtration apparatus and methods are applicable to the preparation of specimens for all forms of microscopic examination including, without limitation, bright field, oblique illumination, dark field, dispersion staining, phase contrast, differential interference contrast, interference reflection, fluorescence, confocal, and deconvolution. In addition to optical microscopy, the apparatus and methods are also applicable to the preparation of specimens for electron microscopy, X-ray microscopy.

In one embodiment there is provided a filter composed of microscopically-interrogatable material, for the type of microscopy to be performed (e.g. in light microscopy the microscopically-interrogatable material may be translucent or transparent). Such filter is configured to be of a size and shape to allow for its incorporation onto a conventional microscope slide and may also be of such configuration to allow for complete coverslipping of the same. In one aspect of such embodiment, there is provided in conjunction with the material comprising the filter, reagents that are useful for microscopic examination of the components of the filtrand that may be of interest in the microscopic examination. In such aspect, there is avoided the need to later treat the filter/filtrand once transferred to the microscope slide.

In another embodiment, there is provided a microscope slide operatively configured to allow for filtration through at least a portion of such slide. For example, such microscope slide may have holes bored therein at a portion to fabricate a filter. The slide may alternatively, or in conjunction therewith, be fabricated with materials at at least a portion thereof, in a manner to allow for filtration of materials through the slide at such at least portion. For example, the slide may have a portion thereof fabricated from materials that allow for a porosity. In one aspect of such embodiment, there is provided in conjunction with the material comprising the filter, reagents that are useful for microscopic examination of the components of the filtrand that may be of interest in the microscopic examination, obviating later processing of filtrand on the microscope slide.

In further embodiments there is described an apparatus for filtering components of a fluid specimen on the basis of size of the targeted component under controlled conditions. In one such embodiment, there is disclosed a filtration apparatus comprising a collector assembly for incorporating a microscopically interrogatable filter between a fustrum top portion and a funnel base portion. The fustrum top portion may comprise an upper edge defining an upper mouth opening for receiving the filtrate and a lower edge defining a lower exit opening interface, wherein the upper mouth opening has a larger area than the lower exit opening. The lower edge of such frustrum in such embodiment advantageously is configured so as to incorporate a coupling mechanism for coupling to the funnel base portion of said collector assembly. The collector assembly is also configured to allow for a filter to be removably located between said fustrum and said funnel based portion. Advantageously such filter is a microscope slide with filtering capability of a filter comprised of such material, and configured, so as to allow for a particularly desired microscopic examination, such as light interrogation microscopy.

The funnel base portion of such embodiment collector assembly, may further comprise a drain conduit allowing for transmission of the supernatant or unfiltered material to ambient environment (that is, an environment outside of the collector assembly). Such conduit may have associated therewith a housing connector allowing said assembly to be directly coupled to a housing which may incorporate functionality configured to permit more efficient and/or expeditious filtration through the collector assembly. For example, such housing may include a negative pressure pump for applying a pressure differential across the collector assembly in permit advantageous filtration across the particular filter located between the fustrum and the funnel base portion. It may also include other functionalities, such as temperature control, level sensing devices, and illumination control.

In another embodiment, a method for filtration comprises installing a filter in a collector assembly; introducing specimen into collector of said collector assembly; causing said specimen to pass through said filter; removing said filter from said collector assembly; coverslipping said filter; and mounting said filter in microscope for examination.

In embodiments there is further disclosed a microscope slide comprising a substrate with parallel upper and lower surfaces, a portion of the substrate defining a first region configured to have filtration properties, such as porosity, so as to permit passage of first material from the upper surface through the lower surface and retention of second material on the upper surface. The porosity may be provided by a plurality of laser drilled apertures penetrating from the upper surface to the lower surface.

An additional embodiment is a microscope slide assembly comprising: a microscope slide with top and bottom surfaces, the top surface operatively configured to mount the planar filter; a planar filter with upper and lower surfaces comprised of a material having filtration properties between the parallel upper and lower surfaces allowing passage of a first material from the upper surface through the lower surface and retention of second material on the upper surface, the planar filter being dimensioned to allow for complete residence on the same top surface of the microscope slide and to allow complete coverage of the same by a microscope coverslip. The microscope slide may incorporate a recess partially penetrating the microscope slide and sized to accept the planar filter.

A further embodiment is a collector assembly comprising: a collector configured as a hollow frustrum comprising an upper edge defining an upper mouth opening and a lower edge defining a lower exit opening interface, the upper mouth opening having a larger area than the lower exit opening, the lower edge comprising at least a portion of a coupling mechanism; a funnel base having a bottom surface and a top surface, the top surface being configured to sealingly couple to the lower edge of the collector with the at least portion of a coupling mechanism, the funnel base further comprising a drain conduit that penetrates the floor; and an isolated filter dimensioned and configured to be able to reside between the collector and the funnel base when each is coupled to one another where the filter is further dimensionally configured to be capable of residing entirely on the surface of a conventional microscope slide and covered by a conventional coverslip. The physical dimensions of the filter may be suitable for mounting and coverslipping the filter on a standard microscope slide. The filter may comprise parallel upper and lower surfaces and a plurality of through-holes penetrating from the upper surface to the lower surface. The filter may comprise a second region, outside of the first region, the second region with a second plurality of through-holes penetrating from the upper surface to the lower surface, the second plurality of through-holes arranged in a regular pattern and having the same through-hole diameter as the through-holes in the first region. The apparatus may further comprise a housing including a mechanical holding fixture that removably holds the collector assembly in a vertical position; and a fluid pump having an input port that is operatively connected, by an external drain tube, to the drain conduit and an output port operatively connected by a disposal conduit to a drain.

In an addition embodiment a method comprises: installing a filter in a collector assembly; introducing specimen into collector of the collector assembly; causing the specimen to pass through the filter; removing the filter from the collector assembly; coverslipping the filter; mounting the filter in microscope for examination. The method may further comprise, after the step of removing the filter from the collector assembly, mounting the filter on a microscope slide

DESCRIPTION OF DRAWINGS

The accompanying figures incorporated in and forming a part of the specification illustrate several aspects of embodiments of the invention and, together with the description, serve to explain the embodiments. In the drawings.

DETAILED DESCRIPTION

In embodiments there is presented a method and apparatus for the selective filtration of structures, based on their dimensional properties, and contained in a fluid sample. The apparatus performs the filtration under controlled environmental conditions and provides the means to present the filtrate for subsequent microscopic examination.

Figure 1:
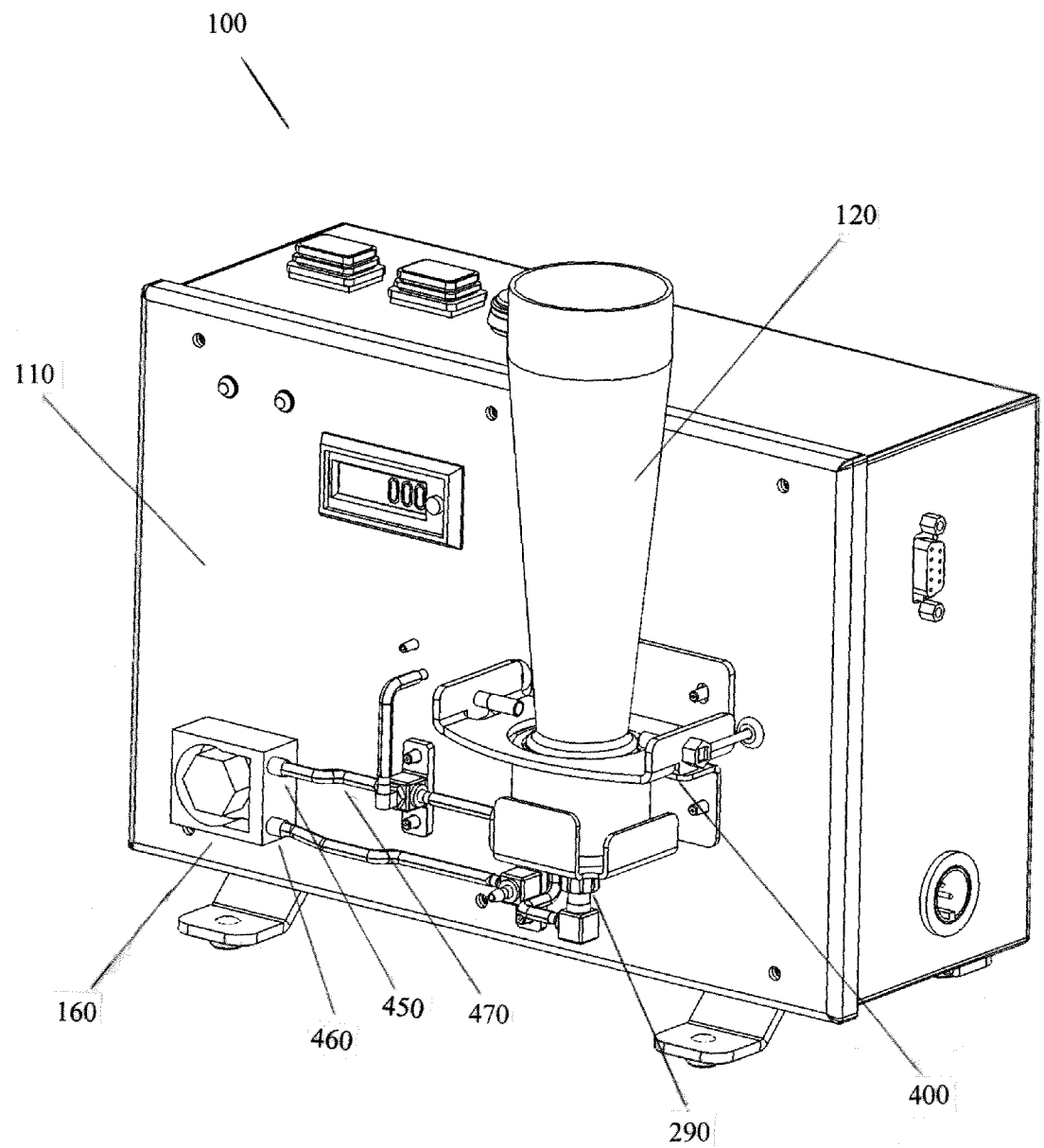
FIG. 1 is a diagram of the filtration apparatus comprising the collector and the housing.

In a non-limiting embodiment, an apparatus for selectively filtering fluid samples is shown in FIG. 1. The apparatus 100, in part, comprises a collector assembly 120 and a housing 110. The collector assembly 120 provides a collector 200 that accepts the fluid sample, a filter 130 that filters the fluid sample, and a funnel base 140 that receives the filtrate. The filtrate is exhausted from the funnel base 140 by a drain conduit 150. The collector assembly 120 is mechanically supported, in a vertical orientation, by the housing 110. The housing 110 further comprises a fluid pump 160 to provide the negative pressure to the drain conduit 150 as well as required components such as interconnection conduits, valves, sensors, control mechanisms, and power supplies. In an embodiment, the fluid pump 160 may be a peristaltic pump.

In an embodiment, the filter 130 may be operatively configured so that it may be removed from the filter apparatus 100 and mounted to a microscope slide for microscopic examination. The mounted filter 130 may be further processed, if required by the preparation protocol, and coverslipped. In an alternate embodiment, the filter 130 may be incorporated into a microscope slide thereby providing for the filter-slide to be removed from the filter apparatus further processed, if required by the preparation protocol, coverslipped, and subjected to microscopic examination, thereby eliminating the step of mounting the filter on a microscope slide.

In operation, the fluid sample is introduced into the collector 200 where it flows down to the filter 130 that forms the floor of the collector 200. A negative pressure is applied to the interior of the funnel base 140 thereby causing the fluid sample to be drawn through the filter 130 into the funnel base 140. Targeted structures contained within the fluid sample, having physical dimensions greater than the filter orifices, are retained on the surface of the filter 130 while the filtrate is collected by the funnel base 140. The filter 130 containing the targeted structures may be removed from the collector assembly 120 and mounted on a appropriate medium such as a microscope slide for examination. In an embodiment, the microscope slide may incorporate a recess sized to receive the filter 130.

Figure 2:
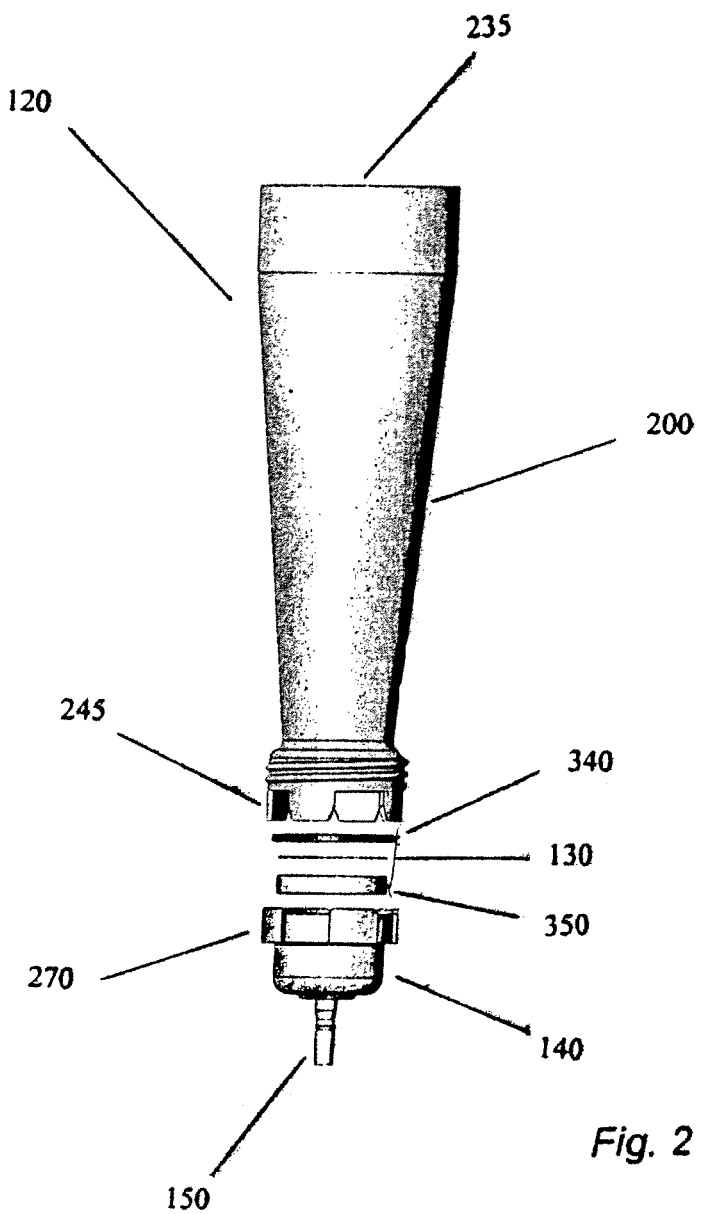
FIG. 2 is a disassembled view of an embodiment of the collector assembly showing the collector, the filter and the funnel base.
Figure 3:
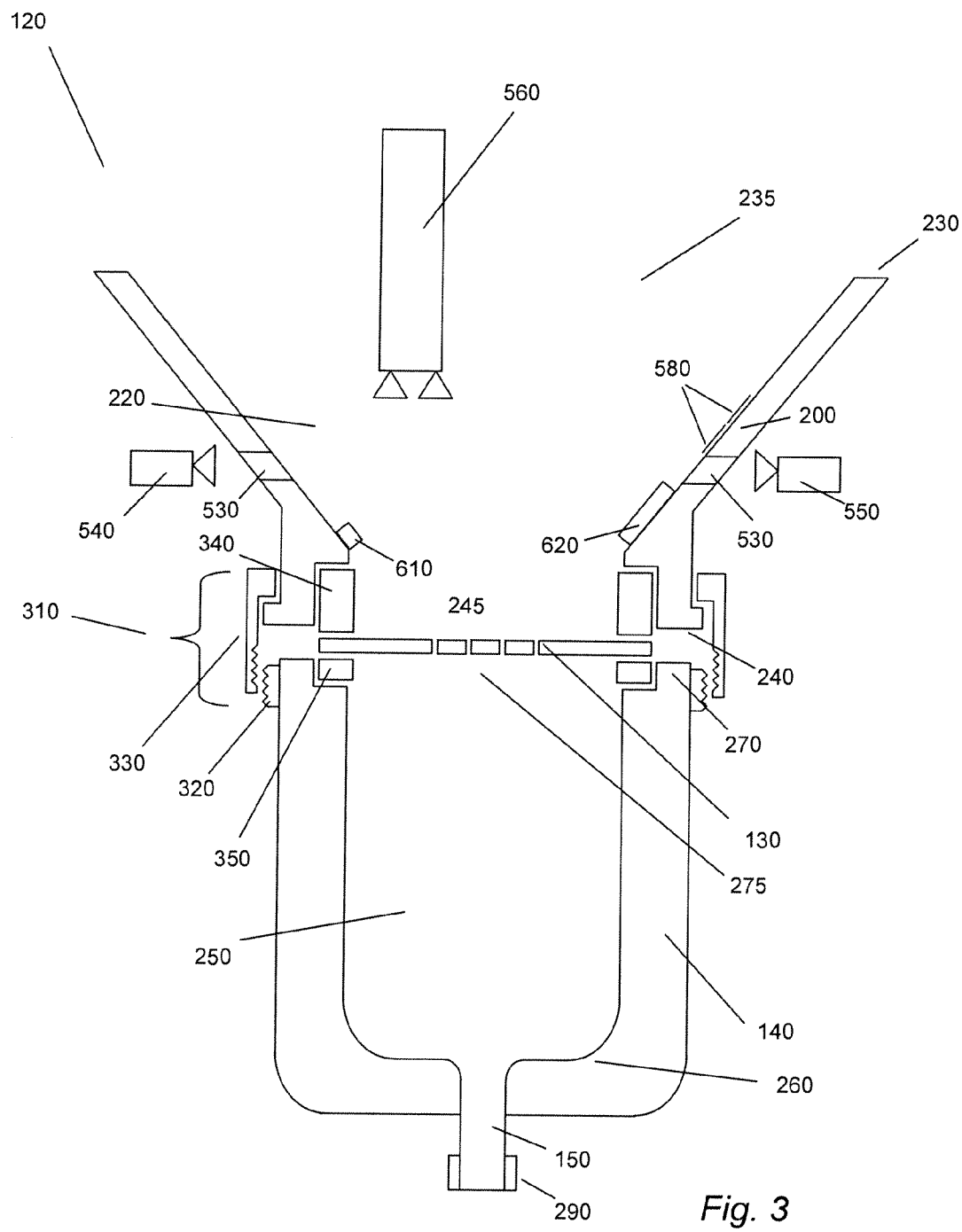
FIG. 3 is a simplified cross sectional view of the collector assembly.

As shown in FIG. 2, the collector assembly 120 comprises a collector 200, a filter 130, and a funnel base 140, each having a circular cross section. As shown in FIG. 3, The collector 200 may be a hollow frustrum defining a collector volume 220, with an upper edge 230, defining an upper mouth opening 235, and a lower edge 240, defining a lower exit opening 245. The upper mouth opening 235 has a larger area than the lower exit opening 245.

The funnel base 140 may be a hollow cylindrically shaped container, defining a funnel base volume 250, and having a floor 260 at the bottom and a top edge 270 defining an opening 275 with approximately the same dimensions as the exit opening 245 of the collector 200. A drain conduit 150 penetrates the floor 260 of the funnel base 140 and is externally equipped with a connector 290, such as a Luer Taper fitting, which provides a removable hermetic connection to an external drain tube, not shown.

As shown in cross section in FIG. 3, the lower edge 240 of the collector 200 and the top edge 270 of the funnel base 140 each comprise portions of a coupling mechanism 310 that, when coupled, removably joins the collector 200 to the funnel base 140 with a hermetic seal. In an embodiment, the coupling mechanism 310 may comprise threads 320 on the outer surface of the top edge 270 of the funnel base 140 and a mating threaded nut 330 captured by the outer surface of the lower edge 240 of the collector 200.

The lower edge 240 of the collector 200 and the top edge 270 of the funnel base 140 are configured to retain the filter 130 at the interface between the collector 200 and the funnel base 140 so as to require any fluid introduced into the collector volume 220 to pass through the filter 130 when transiting to the funnel base volume 250. Additional gaskets 340 and spacers 350 may be installed at the peripheral of the filter 130 to form a liquid-tight seal between the filter 130 and the interior surfaces of the collector 200 and funnel base 140. In a non-limiting embodiment, the exit opening 245 of the collector 200 is sized to receive a removable circular filter 130. The lower edge of the collector 200 and the top edge 270 of the funnel base 140 may be formed to accommodate a sandwich comprising at least one sealing gasket 340, the filter 130, and a cylindrical spacer 350. The filter 130 may be circularly disc-shaped with a 25 mm diameter and a plurality of 8 micron diameter thru-holes arranged in a grid pattern, penetrating from the upper to lower surface of the filter element. Depending on filtering requirements, other embodiment filter characteristics and dimensions are envisioned.

Figure 4:
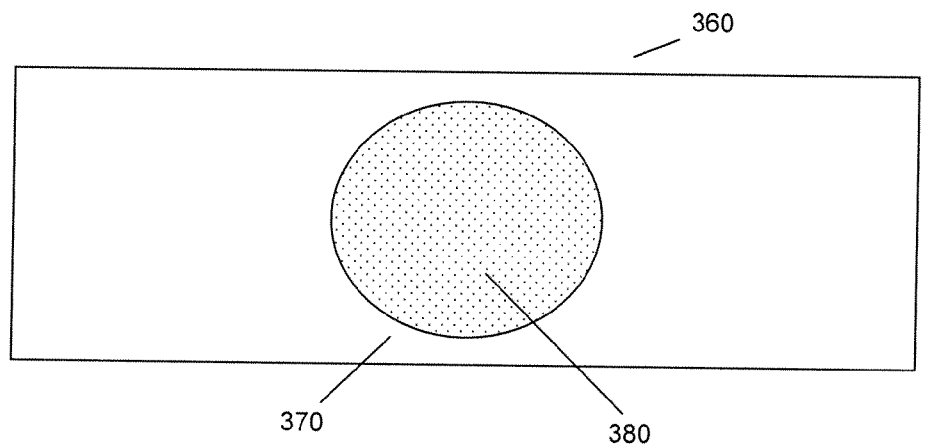
FIG. 4 is a simplified depiction of a slide-filter comprising a microscope slide incorporating a filter structure.
Figure 5:
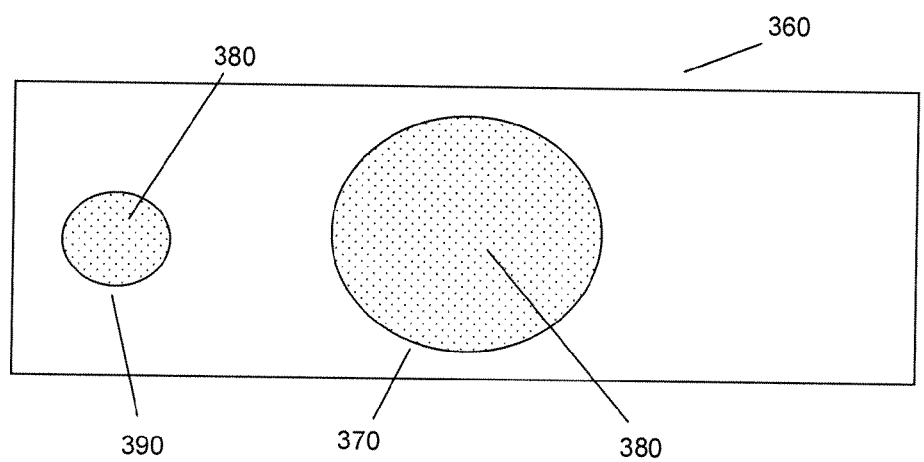
FIG. 5. is a simplified depiction of a slide-filter comprising filter structure in addition to a separate region for placement of control cells.

In an alternate embodiment, the filter 130 may be implemented, as shown in FIG. 4, as a rectangularly shaped filter, or slide-filter 360, having the outer dimensions of a microscope slide. In a non-limiting example, a microscope slide may be 3 inches by 1 inch with a thickness of approximately 1 mm. The slide-filter 360 eliminates the need to affix the filter element to a conventional microscope slide after completion of the filtration process. The slide-filter 360 may include a central region 370 where filter thru-holes 380 are configured in a grid pattern wherein the diameter of each of the thru-holes 380 is chosen to provide the desired filtration characteristics. An example implementation is shown in FIG. 4, where a 25 mm diameter circular central region 370 of the slide is penetrated by a grid arrangement of 8 micron thru-holes 380. Depending on filtering requirements, other filter properties, characteristics and dimensions may be selected. In a second non-limiting embodiment, as shown in FIG. 5, the slide-filter may additionally comprise a second region 390, separate from the central region 370, similarly configured with thru-holes 380. The second region 390 is suitable for receiving a control sample or other material required by the analysis protocol.

In other non-limiting embodiments, the cross sections of the collector, funnel base and filter may be non-circular. In one such embodiment, the collector, funnel base and filter are rectangular and sized to receive a slide-filter having the dimensions of a microscope slide.

Figure 6:
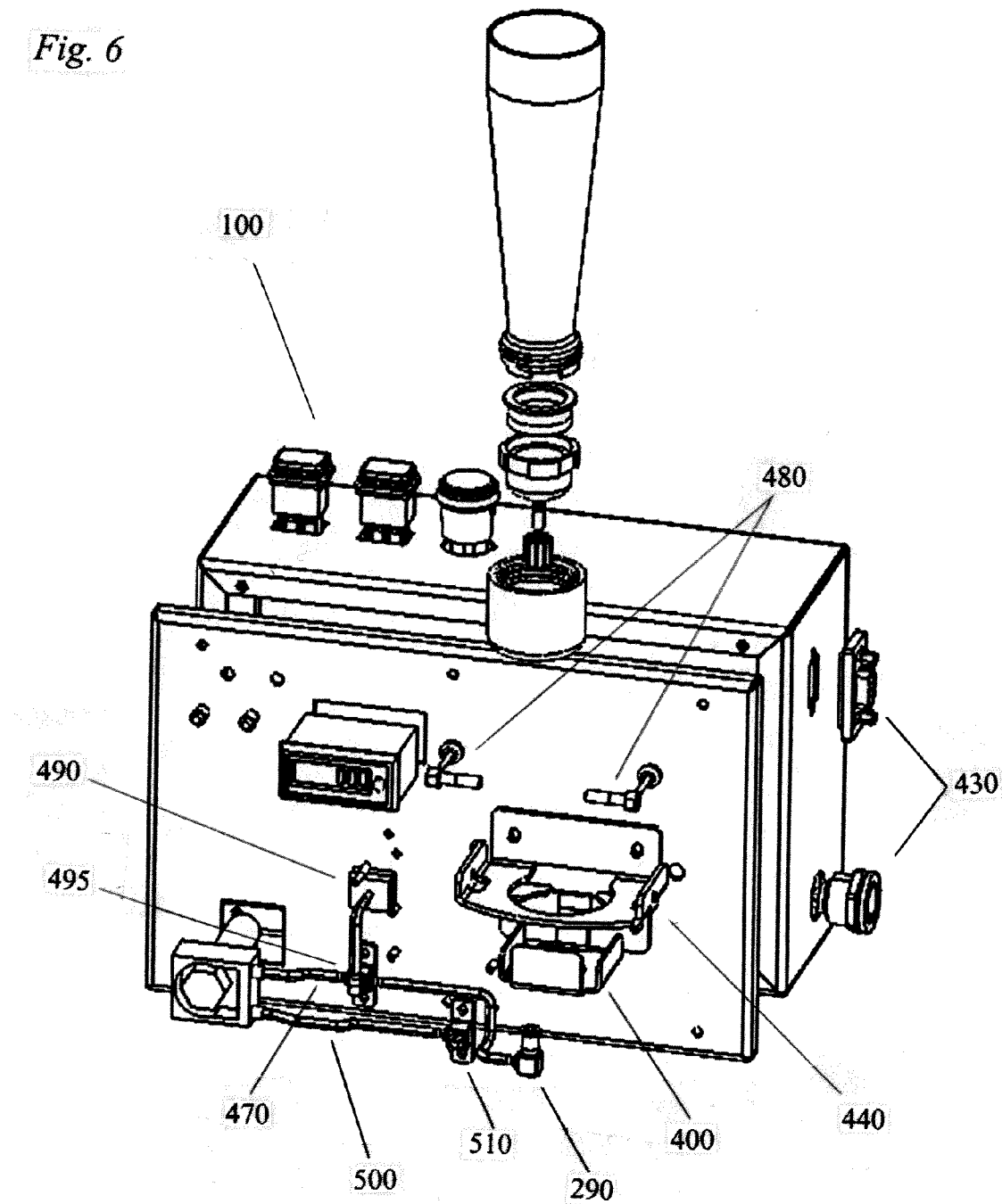
FIG. 6 is a diagram of a filtration apparatus embodiment indicating placement of sensors and interfaces.

In an embodiment, as shown in FIG. 6, the housing 110 comprises a mechanical holding fixture 400 that maintains the collector assembly 120 in a vertical position, a fluid pump 160 that provides the necessary negative pressure to the collector assembly 120, tubing 410 to transport the liquid filtrate, control and sensor sub-systems 420, and power and data interface connectors 430. The mechanical holding fixture 400 may comprise a holding clamp 440 that, in a first state, provides for the installation or removal of the collector assembly 120 from the housing 110, and, in a second state, secures the collector assembly 120 to the housing 110. The fluid pump 160 may be an electrically powered peristaltic pump having an input port 450 and an output port 460. A drain tube 470 connects between the drain conduit 150 exiting the funnel base 140 and the input port 450 of the fluid pump 160.

In addition, the drain tube 470 may comprise one or more ports 495 connected to sensors 490 that measure physical parameters such as pressure or temperature. Additional ports and valves may be included in the drain tube to facilitate purging the pump and its associated fluid conduits. Feedback control of the filtration process may be implemented using control signals derived from sensors 480 located at various monitoring points in the system. The output port 460 of the fluid pump 160 may be connected to a disposal conduit 500 that conveys the fluid exhausted by the pump 160 to a disposal drain 510 or other holding receptacle.

The collector assembly 120 may be instrumented, as shown in FIG. 3, to sense fluid level within the collector 200 thereby enabling feedback control of the fluid pump 160. Measurements of the level of the sample fluid and its rate of change may be used to modulate the speed of the fluid pump so that the filter 130 remains wetted and the filtration speed is constrained within predetermined limits.

One or more level sensors 520 may measure the sample fluid level within the collector 200. In an embodiment, the collector 200 may be fabricated from optically transparent material or may incorporate optically transparent windows 530 to permit sensing of the fluid level in the collector 200. A light source 540, such as an LED, may be configured to shine a beam of light through an entry optical window 530, located in the wall of the collector 200, toward an exit optical window. An electro-optical light sensor 550 may be positioned at the exit optical window external to the collector 200, to receive the beamed light. The positions of the light source 540 and electro-optical light sensor 550, relative to the collector 200, may be chosen no that fluid inside the collector, exceeding a predetermined level, attenuates the light beam. The electro-optical light sensor 550 can detect the light beam attenuation thereby sensing the presence of fluid at the pre-determined level.

In alternate embodiments, an acoustical level detector 560 mounted either on the collector 200 or the main frame 110 may perform level sensing. The acoustical level detector 560 determines the distance to the upper surface of the fluid by measuring the time it takes for a pulse of ultrasonic energy, radiated from the detector 560, to bounce off the surface of the fluid and return to the detector 560.

In an alternate embodiment, a capacitive fluid level sensor comprising a pair of conductive pads 580, electrically insulated from the sample fluid, is affixed to the interior walls of the collector 200. The pair of conductive pads 580 exhibits an electrical capacitance, the magnitude of which is, in part, determined by the dielectric constant of the medium occupying the space between the pads. The electrical capacitance of the sensor changes value when the sample fluid drains below the conductive pads 580. The capacitance change may be measured with an electrical bridge circuit that is well known to those skilled in the art. The measured capacitance thereby indicates the level of the fluid.

The collector apparatus 100 may be instrumented to measure fluid pressure in the drain conduit 150. As shown in FIG. 6, an electrical pressure sensor 490 is connected to the drain conduit 150 via a tee 495 thereby sensing the negative line pressure. The fluid pressure measurement may be used in a feedback system to control pump speed thereby controlling flow rate. Measurement of fluid pressure may further be used to automatically stop the pump if clogging or clotting occurs.

Filtering protocols requiring thermal control may be achieved in embodiments of the filtration apparatus that actively control the temperature of the specimen. Thermal sensors 610 (FIG. 3) that generate electrical signals indicative of temperature may be implanted in the walls of the collector 200. Electrical heaters 620 may also be implanted in walls of the collector 200. The electrical signals generated by the thermal sensors 610 may be transformed into drive signals applied to the electrical heaters 620 whereby thermal control is achieved. The transformation of the sensor signals into drive signals may be performed by a computational processor, in accordance with a predefined algorithm.

Figure 7:
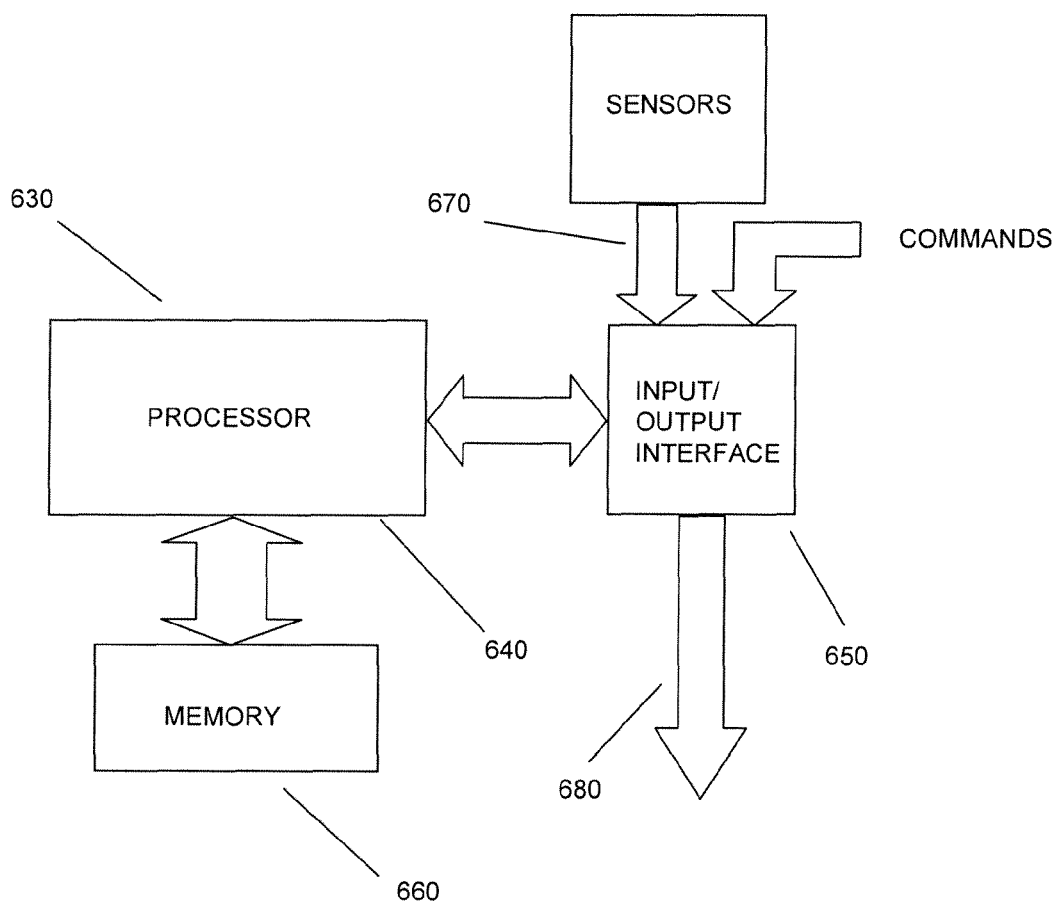
FIG. 7 is a simplified block diagram of an embodiment of a processor system that controls the filtration apparatus.

As shown in FIG. 7, The filtration apparatus 110 may comprise a computer system 630 that controls the filtration process. The computer system 630 may further comprise a processor 640, an input/output interface 650, a memory 660 containing software code that may be executed by the processor, thereby monitoring, controlling, and logging the filtration process. The input/output interface 650 accepts commands, from an operator or controller (not shown), and inputs 670 from the sensors (i.e., pressure, level, temperature etc.) and outputs the drive signals 680 to be applied to the fluid pump and, optionally, electrical heaters 620.

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

What is claimed is:

1. A collector assembly comprising:
   a collector configured as a hollow frustum comprising an upper edge defining an upper mouth opening and a lower edge defining a lower exit opening interface, said upper mouth opening having a larger area than said lower exit opening, said lower edge comprising at least a portion of a coupling mechanism;
   a funnel base having a bottom surface and a top surface, said top surface being configured to sealingly couple to said lower edge of said collector with said at least portion of a coupling mechanism, said funnel base further comprising a drain conduit that penetrates said base; a fluid pump having an input port that is operatively connected, by an optional external drain tube, to said drain conduit and an output port operatively connected by a disposal conduit to a drain and operatively driven by computer processing;
   and
   an isolatable filter dimensioned and configured to be able to reside between said collector and said funnel base when said collector and said base are coupled to one another where said filter is further dimensionally configured to be capable of residing entirely on the surface of a conventional microscope slide and covered by a conventional coverslip.

2. The collector assembly in accordance with claim 1 wherein said filter comprises parallel upper and lower surfaces and a plurality of through-holes penetrating from said upper surface to said lower surface.

3. The collector assembly in accordance with claim 1 wherein said filter comprises a substrate with parallel upper and lower surfaces, a center portion of said upper surface defining a first region having filtration properties between said upper surface to said lower surface.

4. The collector assembly in accordance with claim 3 wherein said filtration properties are implemented by a first plurality of through-holes penetrating from said upper surface to said lower surface.

5. The collector assembly in accordance with claim 3, further comprising a second region, outside of said first region, said second region with a second plurality of through-holes penetrating from said upper surface to said lower surface, said second plurality of through-holes arranged in a regular pattern and having the same through-hole diameter as said through-holes in said first region.

6. The collector assembly in accordance with claim 3, wherein said filter is a microscope filtration slide wherein the first region is a circular region having a diameter of approximately 25 mm.

7. The collector assembly in accordance with claim 5 wherein a microscope filtration slide through-holes has each a diameter of approximately 8 microns.

8. The collector assembly in accordance with claim 1 further comprising:
   a housing comprising:
   a mechanical holding fixture that removably holds said collector assembly in a vertical position; and
   a fluid pump having an input port that is operatively connected, by an optional external drain tube, to said drain conduit and an output port operatively connected by a disposal conduit to a drain.

9. The collector assembly in accordance with claim 8 wherein said housing further comprises at least one pressure sensor operatively connected to said optional external drain tube.

10. The collector assembly in accordance with claim 8 wherein said housing further comprises a computer operatively connected to said at least one pressure sensor and said fluid pump.

11. The collector assembly in accordance with claim 8 wherein said housing further comprises at least one level detecting device located to detect fluid level within said collector.

12. The collector assembly in accordance with claim 9 wherein said housing further comprises a computer operatively connected to said at least one level detecting device and said fluid pump.

13. A method comprising:
installing a filter in a collector assembly;
introducing a specimen into a collector part of said collector assembly;
causing said specimen to pass through said filter;
removing said filter from said collector assembly;
coverslipping said filter;
mounting said filter in a microscope for examination.

14. The method in accordance with claim 13 further comprising, after the step of removing said filter from said collector assembly:
mounting said filter on a microscope slide.

* * * * *